United States Patent
Bickerstaff et al.

(10) Patent No.: US 10,025,293 B2
(45) Date of Patent: Jul. 17, 2018

(54) OBJECT PRODUCTION

(71) Applicant: BAE Systems plc, London (GB)

(72) Inventors: John Bickerstaff, Lancashire (GB);
David Mark Wilson, Lancashire (GB)

(73) Assignee: BAE Systems plc, London (GB)

( * ) Notice: Subject to any disclaimer, the term of this patent is extended or adjusted under 35 U.S.C. 154(b) by 56 days.

(21) Appl. No.: 15/303,860

(22) PCT Filed: Apr. 10, 2015

(86) PCT No.: PCT/GB2015/051090
§ 371 (c)(1),
(2) Date: Oct. 13, 2016

(87) PCT Pub. No.: WO2015/162400
PCT Pub. Date: Oct. 29, 2015

(65) Prior Publication Data
US 2017/0036780 A1     Feb. 9, 2017

(30) Foreign Application Priority Data

Apr. 24, 2014  (EP) ..................................... 14275090
Apr. 24, 2014  (GB) ................................... 1407184.9

(51) Int. Cl.
*B64F 5/00* (2017.01)
*G05B 19/4097* (2006.01)
(Continued)

(52) U.S. Cl.
CPC ........ *G05B 19/4097* (2013.01); *B64F 5/0009* (2013.01); *B64F 5/10* (2017.01); *G05B 19/4099* (2013.01); *G05B 2219/35134* (2013.01)

(58) Field of Classification Search
CPC ...... B64F 5/0009; B64F 5/10; G05B 19/4097; G05B 19/4099; G05B 2219/35134
See application file for complete search history.

(56) References Cited

U.S. PATENT DOCUMENTS 4,196,522 A    4/1980   Bell et al.
4,945,488 A *  7/1990   Carver ............... G05B 19/4097
                                                700/182
(Continued)

FOREIGN PATENT DOCUMENTS

DE        19900950 C1    5/2000
EP         1139189 A2   10/2001
(Continued)

OTHER PUBLICATIONS

Great Britain Search Report under Sections 17 of Application No. GB1407186.4, dated Aug. 20, 2014, 3 pages.
(Continued)

*Primary Examiner* — Yuhui R Pan
(74) *Attorney, Agent, or Firm* — Maine Cernota & Rardin

(57) ABSTRACT

Disclosed is a method of producing an object, the method comprising: providing a workpiece comprising a plurality of attachment features for attaching the workpiece to a machining fixture; determining a datum, the datum being dependent upon the relative positions of the attachment features; measuring the surface of the workpiece with respect to the datum; providing the machining fixture; attaching, using the attachment features, the workpiece to the machining fixture; providing a digital model specifying the object including the attachment features; and, thereafter, using the measurements of the workpiece surface and the digital model, controlling machining apparatus with respect to the datum to machine the workpiece so as to produce the object as specified by the digital model.

14 Claims, 11 Drawing Sheets

(51) Int. Cl.
  *G05B 19/4099* (2006.01)
  *B64F 5/10* (2017.01)

(56) References Cited

U.S. PATENT DOCUMENTS

| | | | |
|---|---|---|---|
| 5,806,797 | A | 9/1998 | Micale |
| 6,519,860 | B1 | 2/2003 | Bieg |
| 6,692,681 | B1 | 2/2004 | Lunde |
| 8,088,317 | B1 | 1/2012 | Karem |
| 2002/0133252 | A1 | 9/2002 | Landers |
| 2004/0093731 | A1 | 5/2004 | Sarh |
| 2006/0108058 | A1 | 5/2006 | Chapman |
| 2006/0225265 | A1 | 10/2006 | Burnett et al. |
| 2007/0222122 | A1 | 9/2007 | Ong |
| 2008/0134505 | A1 | 6/2008 | Gabriel et al. |
| 2008/0246175 | A1 | 10/2008 | Biomstad |
| 2009/0145545 | A1 | 6/2009 | Brennan |
| 2010/0068450 | A1 | 3/2010 | Lloyd |
| 2010/0170996 | A1 | 7/2010 | Sankaran |
| 2010/0269979 | A1 | 10/2010 | Abitz |
| 2011/0156304 | A1 | 6/2011 | Walker et al. |
| 2012/0219764 | A1 | 8/2012 | Biornstad et al. |
| 2012/0239181 | A1 | 9/2012 | Gu et al. |
| 2013/0117983 | A1 | 5/2013 | Sana et al. |
| 2013/0130016 | A1 | 5/2013 | Hodgson et al. |
| 2013/0019446 | A1 | 6/2013 | Venskus |
| 2014/0059856 | A1* | 3/2014 | Simmons ............. G05B 19/404 29/889.7 |

FOREIGN PATENT DOCUMENTS

| | | | | |
|---|---|---|---|---|
| EP | 1230124 | B1 | 12/2005 | |
| EP | 1952972 | A1 | 6/2008 | |
| EP | 2772427 | A1 | 3/2014 | |
| EP | 2703919 | A2 | 5/2014 | |
| FR | 2788743 | A1 | 7/2000 | |
| GB | 2350809 | A * | 12/2000 | ............. B23P 6/007 |
| GB | 2441226 | A | 2/2008 | |
| WO | 199850180 | A | 11/1998 | |
| WO | 0136270 | A1 | 5/2001 | |
| WO | 20010036270 | A1 | 5/2001 | |
| WO | 2014046783 | A1 | 3/2014 | |

OTHER PUBLICATIONS

Great Britain Combined Search and Examination Report under Sections 17 and 18(3) of Application No. GB1506734.1, dated Oct. 21, 2015, 5 pages.
International Search Report and Written Opinion of PCT Application No. PCT/GB2015/053477, dated Mar. 7, 2016, 12 pages.
International Preliminary Report on Patentabiity of International Application No. PCT/GB2015/053477, dated May 23, 2017, 8 pages.
Great Britain Combined Search and Examination Report under Section 17 and 18(3) of Application No. GB1506075.9, dated Sep. 27, 2015, 6 pages.
Great Britain Search Report under Section 17(5) of Application No. GB1407185.6, dated Oct. 29, 2014, 4 pages.
International Search Report and Written Opinion of Application No. PCT/GB2015051091, dated Feb. 19, 2016, 12 pages.
International Search Report of Application No. PCT/GB2015/051090, dated Oct. 12, 2015, 3 pages.
Great Britain Search Report under Section 17(5) of Application No. GB1407184.9, dated Nov. 26, 2014, 3 pages.
Great Britain Search Report under Section 17 of Application No. GB1506074.2, dated Sep. 9, 2015, 3 pages.
Great Britain Search Report under Section 17(5) of Application No. GB1407186.4, dated Aug. 20, 2014, 3 pages.
Great Britain Combined Search and Examination Report under Sections 17 and 18(3) of Application No. GB1506076.7, dated Aug. 21, 2015, 5 pages.
International Search Report and Written Opinion of Application No. PCT/GB2015/051092, dated Apr. 4, 2016, 12 pages.
Great Britain Search Report under Section 17(5) of Application No. GB1407181.5, dated Oct. 29, 2014, 5 pages.
Great Britain Combined Search and Examination Report under Sections 17 and 18(3) of Application GB1506078.3, dated Sep. 29, 2015, 5 pages.
International Preliminary Report on Patentability of Application No. PCTGB2015051095, dated Jan. 8, 2016, 7 pages.
International Search Report and Written Opinion of Application No. PCTGB2015051095, dated Oct. 5, 2015, 9 pages.
Great Britain Search Report under Section 17(5) of Application No. GB1407183.1, dated Oct. 15, 2014, 3 pages.
International Search Report and Written Opinion of Application No. PCTGB2015051110, dated Sep. 29, 2016, 10 pages.
Great Britain Combined Search and Examination Report under Section 17 and 18(3) of Application No. GB1506205.2, dated Sep. 30, 2015, 6 pages.
International Preliminary Report on Patentability of Application No. PCTGB2015051110, dated Sep. 13, 2016, 7 pages.
Great Britain Search Report under Section 17(5) of Application No. GB1420539.7, dated Apr. 29, 2015, 3 pages.
Great Britain Search Report under Section 17(5) of Application No. GB1500973.1, dated Mar. 2, 2015, 3 pages.
International Search Report and Written Opinion of Application No. GB/2015/051179, dated Apr. 15, 2016, 12 pages.
International Search Report and Written Opinion of Application No. PCT/GB2015/051111, dated Feb. 23, 2016, 11 pages.
Great Britain Combined Search and Examination Report under Sections 17 and 18(3) of Application No. GB1506207.8, dated Oct. 1, 2015, 5 pages.
Great Britain Search Report under Section 17(5) of Application No. GB1500946.7, dated Mar. 3, 215, 5 pages.
International Search Report and Written Opinion of Application No. GB/2015/051090, dated Oct. 25, 2016, 8 pages.
International Search Report and Written Opinion of Application No. GB/2015/051091, dated Oct. 25, 2016, 9 pages.
International Search Report and Written Opinion of Application No. GB/2015/051092, dated Oct. 25, 2016, 9 pages.
International Search Report and Written Opinion of Application No. GB/2015/051111, dated Oct. 25, 2016, 8 pages.
International Search Report and Written Opinion of Application No. GB/2015/051179, dated Oct. 25, 2016, 9 pages.

* cited by examiner

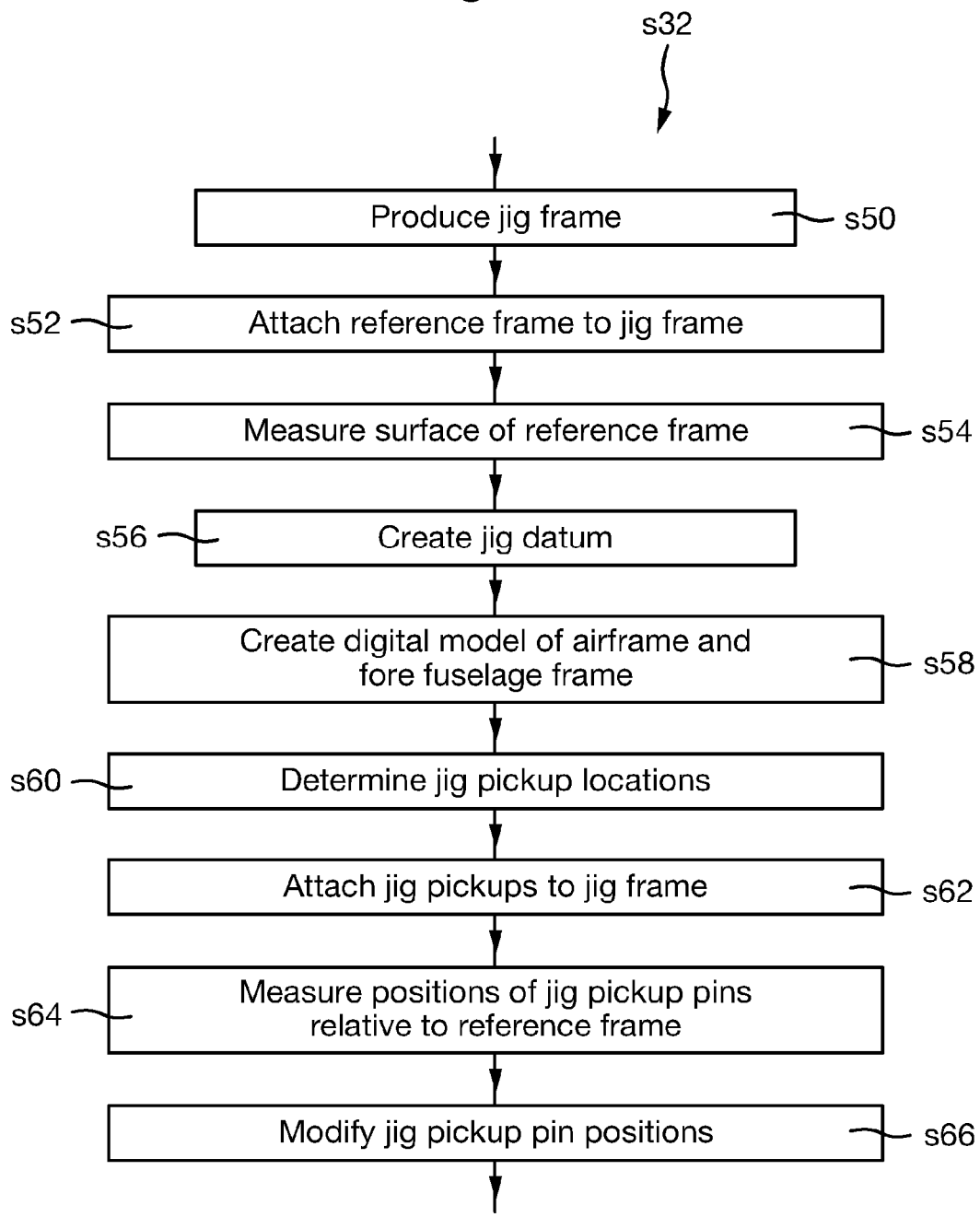

OBJECT PRODUCTION

RELATED APPLICATIONS

This application is a national phase application filed under 35 USC § 371 of PCT Application No. PCT/GB2015/051090 with an International filing date of Apr. 10, 2015 which claims priority of GB Patent Application 1407184.9 filed Apr. 24, 2014 and EP Patent Application 14275090.0 filed Apr. 24, 2014. Each of these applications is herein incorporated by reference in its entirety for all purposes.

FIELD OF THE INVENTION

The present invention relates to methods of producing objects.

BACKGROUND

Aircraft airframes typically comprise a plurality of frames (or formers) and longerons (or stringers/stiffeners). The frames are typically laterally spaced from one another and arranged perpendicular to the longitudinal axis of the aircraft. The primary purpose of formers is to establish the shape of the fuselage and reduce the column length of the longerons. The longerons are typically elongate members which are attached to the frames and are arranged parallel to the longitudinal axis of the aircraft. The longerons support the aircraft skin and, in use, transfer aerodynamic loads acting on the skin onto the frames.

It is desirable that aircraft airframes are produced to be within very tight tolerance bounds.

Production of an aircraft airframe typically comprises producing two or more separate airframe sections (for example, a fore fuselage section, an aft fuselage section, and a tail section), and subsequently attaching those sections together.

It tends to be very difficult to produce separate airframe sections with a sufficient level of precision to allow for easy assembly of the airframe. Lengthy and expensive shimming processes may be required to fill gaps between the airframe sections when those sections are attached together.

Production of a section of an aircraft airframe typically involves the use of airframe assembly tools designed to support airframe components while they are being worked on and to locate different components together in the correct relative positions during airframe assembly. Traditionally, each different assembly process has required at least one dedicated assembly tool, which is produced specifically for a given set of components and which is designed to support the components in a particular manner so that assembly operations can be carried out without interference from the tool. Such assembly tools are manufactured to exacting standards.

A conventional assembly tool comprises a rigid metal jig whose framework is constructed from welded box section steel. A plurality of pick-up devices is mounted on the framework for carrying the aircraft components during the assembly process, and these too are conventionally produced from welded steel parts.

EP 1 230 124 discloses such an assembly tool.

SUMMARY OF THE INVENTION

In a first aspect, the present invention provides a method of producing an object, the method comprising: providing a workpiece comprising a plurality of attachment features for attaching the workpiece to a machining fixture; determining a datum, the datum being dependent upon the relative positions of the attachment features; measuring the surface of the workpiece with respect to the datum; providing a machining fixture; attaching, using the attachment features, the workpiece to the machining fixture; providing a digital model specifying the object including the attachment features; and thereafter, using the measurements of the workpiece surface and the digital model, controlling machining apparatus with respect to the datum to machine the workpiece so as to produce the object as specified by the digital model.

The machining of the workpiece is performed with respect to the datum. Thus, object features (e.g. the surface) of the object are produced with respect to the attachment features of the object. The attachment features of the object tend to be those points on the workpiece that are most securely held by the machining fixture. Thus all object features are machined with respect to a secure datum and hence tend to be produced with high accuracy with respect to one another.

The object may be a component part of a system and the plurality of attachment features are further configured to attach the object to an assembly tool during a process of assembling the system.

The object may be a component of an airframe selected from the group of airframe components consisting of a frame and a longeron.

The step of determining the datum may comprise measuring the relative positions of the attachment features on the workpiece, and, using the measurements of the relative positions of the attachment features, calculating the datum.

The machining fixture may comprise a plurality of receiving elements for receiving the attachment features of the workpiece, the relative positions of the receiving elements being dependent upon the relative positions of the attachment features. The step of determining the datum may comprise measuring the relative positions of the receiving elements on the machining fixture, and, using the measurements of the relative positions of the receiving elements, calculating the datum.

The step of providing the machining fixture may comprise: providing an initial machining fixture; providing a further digital model specifying the machining fixture; and, using the further digital model and the datum, controlling machining apparatus with respect to the datum to machine the initial machining fixture so as to produce the machining fixture as specified by the further digital model.

The machining fixture may comprise one or more reference surfaces, each reference surface being associated with an object feature. Machining the workpiece may comprise, for each reference surface, locating at least part of the machining apparatus against that reference surface and controlling the machining apparatus to move away from that reference surface with respect to the datum to machine the workpiece so as to form the object feature associated with that reference surface.

The step of providing the further digital model may comprise: using the digital model of the object, identifying one or more object features; for each identified feature, determining a position and orientation of a reference surface relative to the datum; and, using the determined a positions and orientations of the one or more reference surfaces, determining the further digital model.

In a further aspect, the present invention provides an assembly process for producing a system, the assembly process comprising: producing an object according to the preceding aspect; providing an assembly tool; attaching, using the attachment features of the object, the object to the assembly tool; and performing an assembly operation on the at least one objects, thereby producing the system.

The system may be at least part of an airframe of an aircraft and the object is a component part of the at least part of an airframe.

The system may be for attachment to a further system. The step of providing the assembly tool may comprise: determining, when the system is attached to a further system, a position and orientation of the object relative to the further system; using the determined position and orientation of the object relative to the further system, determining one or more positions and orientations relative to the further system at which the object is to be supported; providing a jig frame; attaching, to the jig frame, a reference structure; providing one or more plurality of pickup devices, each having a receiving element for receiving a component of the system; and securing each pickup device to the jig frame such that a position and orientation relative to the reference structure of each receiving element is the same as a respective determined position and orientation relative to the further system at which the object is to be supported.

In a further aspect, the present invention provides apparatus for producing an object, the apparatus comprising: means for providing a workpiece, the workpiece comprising a plurality of attachment features for attaching the workpiece to a machining fixture; one or more processors configured to determine a datum, the datum being dependent upon the relative positions of the attachment features; measurement apparatus for measuring the surface of the workpiece with respect to the datum; a machining fixture configured to receive the workpiece; and machining apparatus configured to, using the measurements of the workpiece surface and a digital model the object including the attachment features, be controlled with respect to the datum so as to machine the workpiece so as to produce the object as specified by the digital model.

In a further aspect, the present invention provides an object produced using a method according to any of the preceding aspects.

In a further aspect, a system produced using a method according to any of the preceding aspects. The system may be an aircraft.

BRIEF DESCRIPTION OF THE DRAWINGS

FIG. 12 is a process flow chart showing certain steps of an embodiment of a process of producing the jig.

DETAILED DESCRIPTION

It will be appreciated that relative terms such as horizontal and vertical, top and bottom, above and below, front and back, upper and lower, and so on, are used herein merely for ease of reference to the Figures, and these terms are not limiting as such, and any two differing directions or positions and so on may be implemented rather than truly horizontal and vertical, top and bottom, and so on.

Figure 1:
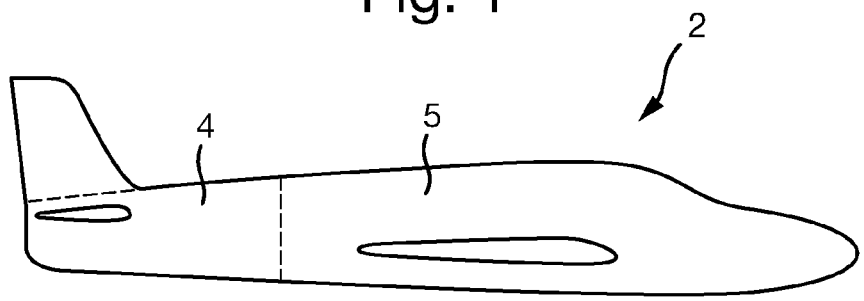
FIG. 1 is a schematic illustration (not to scale) of an example aircraft.

FIG. 1 is a schematic illustration (not to scale) of an example aircraft 2 comprising an aft fuselage 4, and an aircraft fore section 5. The aircraft fore section 5 includes a central fuselage to which the aft fuselage 4 is attached.

The aft fuselage 4 comprises an airframe and an aircraft skin fastened to the airframe. In this embodiment, the aft fuselage 4 comprises a port boom and a starboard boom that are mechanically attached together along a centreline. Each boom of the aft fuselage 4 comprises a plurality of structural components (for example, frames, keels, longerons, and skins) that are mechanically attached together.

Figure 2:
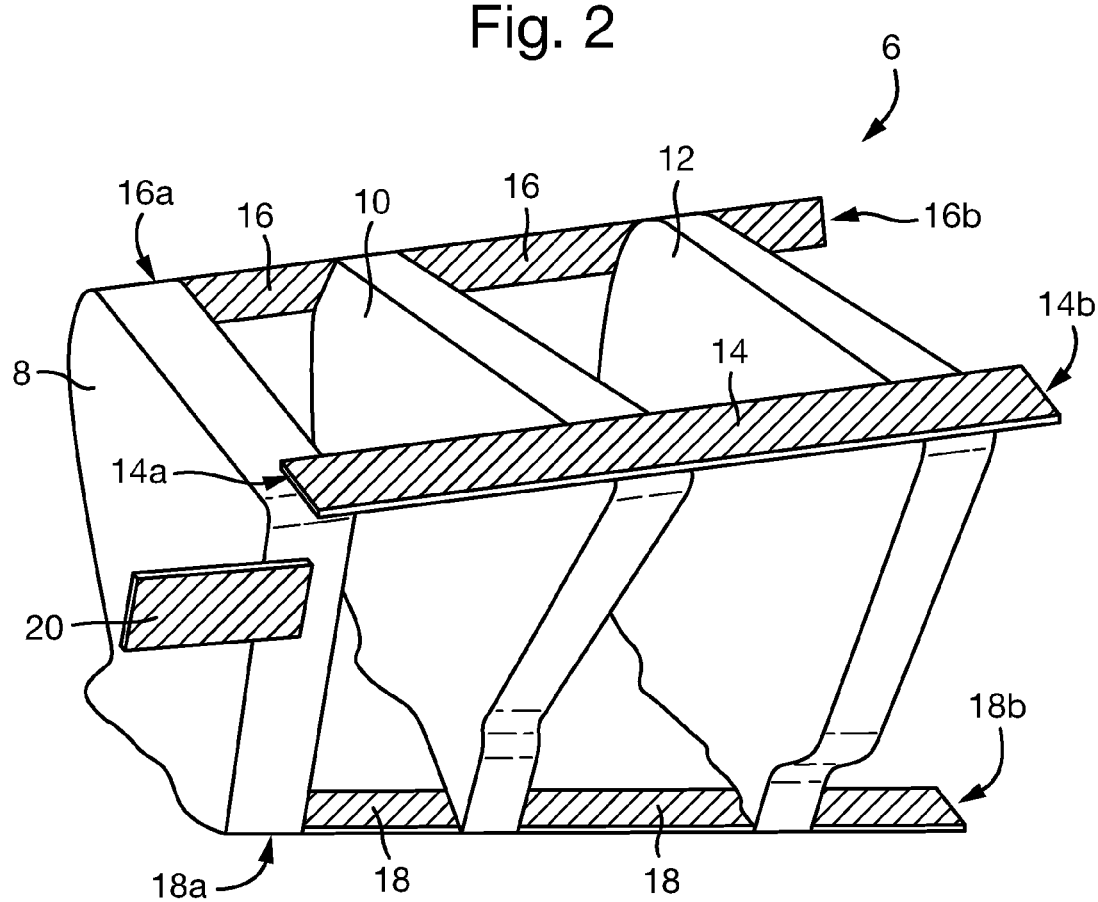
FIG. 2 is a schematic illustration (not to scale) of a portion of an airframe of an aft fuselage of the aircraft.

FIG. 2 is a schematic illustration (not to scale) of a portion of the airframe 6 of the aft fuselage 4.

In this embodiment, the airframe 6 comprises three laterally spaced-apart frames or "formers", namely a first frame 8, a second frame 10, and a third frame 12; three longerons, namely a first longeron 14, a second longeron 16, and a third longeron 18; and a beam 20. For reasons of clarity, the longerons 14, 16, 18 and the beam 20 are shown as hashed in FIG. 2.

In this embodiment, the frames 8, 10, 12 are made of aluminium or titanium. The frames 8, 10, 12 define the shape of the aircraft fuselage and, in use, provide stability to the aircraft 2 by preventing or opposing deflection of the longerons 14, 16, 18. When the aircraft 2 is fully assembled, the frames 8, 10, 12 are arranged substantially perpendicularly to the longitudinal axis of the aircraft 2

In this embodiment, the longerons 14, 16, 18 are made of aluminium or titanium. The longerons 14, 16, 18 are elongate members to which the skin of the aircraft is fastened. When the aircraft 2 is fully assembled, the longerons 14, 16, 18 run substantially parallel to the longitudinal axis of the aircraft 2. In this embodiment, the longerons 14, 16, 18 are fastened to the frames 8, 10, 12 by a plurality of bolts. In this embodiment, the first longeron 14 has a first end 14a attached to the first frame 8 and a second free end 14b proximate to the third frame 12. Similarly, the second longeron 16 has a first end 16a attached to the first frame 8 and a second free end 16b proximate to the third frame 12. Similarly, the third longeron 18 has a first end 18a attached to the first frame 8 and a second free end 18b proximate to the third frame 12.

In this embodiment, during assembly of the aircraft 2, the second free ends 14b, 16b, 18b of the longerons 14, 16, 18 are attached to the fore fuselage 5 of the aircraft 2. In particular, the second free ends 14b, 16b, 18b of the longerons 14, 16, 18 are attached to a frame of the fore fuselage 5. This frame of the fore fuselage 5 to which the second free ends 14b, 16b, 18b of the longerons 14, 16, 18 are to be attached is hereinafter referred to as the "fore fuselage frame".

In this embodiment, the beam 20 is made of aluminium or titanium. The beam 20 is an elongate member. The beam 20 is attached at its first end (i.e. a proximal end) to the first frame 8 by a plurality of bolts, and extends away from the frames 8, 10, 12 to its second end (i.e. a distal free end) opposite to its first end. When the aircraft 2 is fully assembled, the beam 20 runs substantially parallel to the longitudinal axis of the aircraft 2.

In this embodiment, in addition to being attached together by the longerons 14, 16, 18, the frames 8, 10, 12 are attached together by further structural elements often called "keels" which are located between adjacent frames 8, 10, 12. For ease of illustration and clarity, these keels are not shown in FIG. 2.

In this embodiment, to produce the aft fuselage 4, a composite aircraft skin is fastened to the airframe 6. The outer shape of the assembled aft fuselage 4 (i.e. the outer shape of the aft fuselage 4 produced by fastening the composite skin to the airframe 6) is hereinafter referred to as the Outer Mould Line (OML) of the aft fuselage 4. In this embodiment, the OML of the aft fuselage 4 is to be within a pre-specified tolerance. The OML of the aft fuselage 4 having the required tolerance is facilitated by the Inner Mould Line (IML) of the aft fuselage 4 being within a pre-specified tolerance. The IML of the aft fuselage 4 is the surface at which the airframe 6 and the aircraft skin abut, i.e. an outer surface of the airframe 6 and inner surface of the aircraft skin.

An embodiment of a process of producing the airframe 6 is described in more detail later below with reference to FIG. 7.

Figure 3:
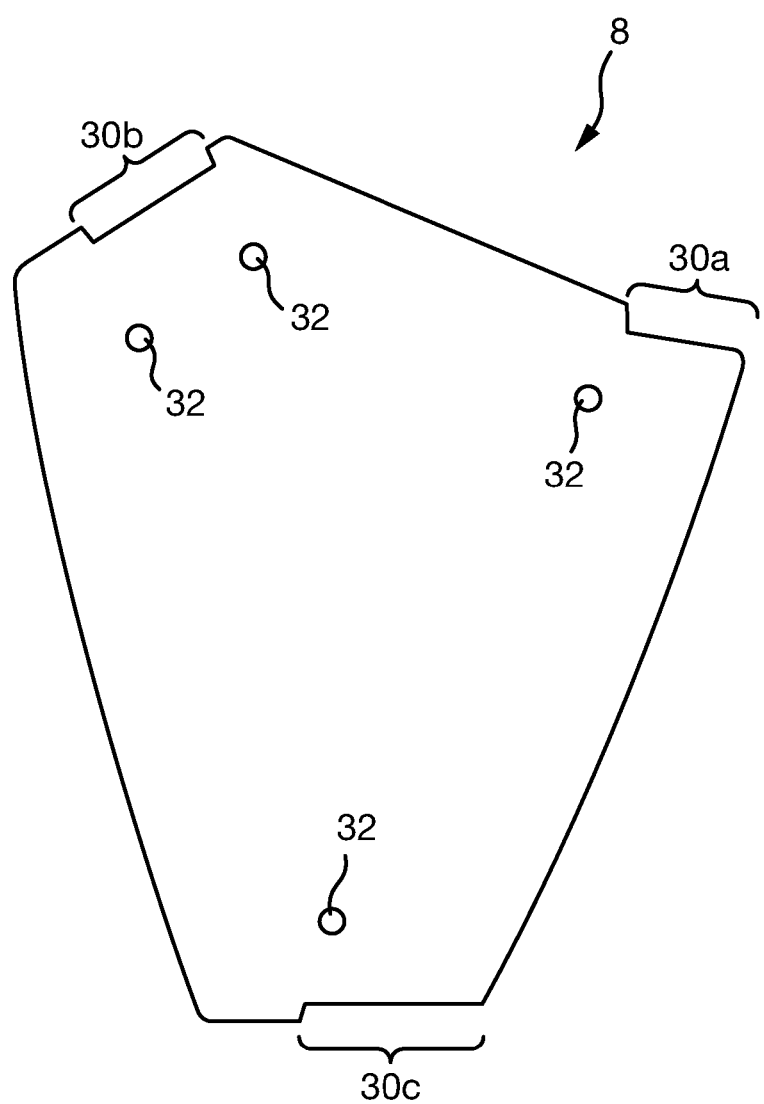
FIG. 3 is a schematic illustration (not to scale) showing a side view of a first frame.

FIG. 3 is a schematic illustration (not to scale) showing a side view of the first frame 8.

The first frame 8 comprises a plurality of longeron landings 30a-c to which, during assembly of the airframe 4, the longerons 14, 16, 18 are fastened. In particular, the first frame 8 comprises a first longeron landing 30a shaped to receive a portion of the first longeron 14, a second longeron landing 30b shaped to receive a portion of the second longeron 16, and a third longeron landing 30c shaped to receive a portion of the third longeron 18. The longeron landings 30a-c are attachment features to which other components, in particular the longerons 14-18, attach.

The first frame 8 further comprises a plurality of fixture attachment features 32. In this embodiment, there are four fixture attachment features 32. As described in more detail later below, the fixture attachment features 32 are for attaching the first frame 8 to a fixture such as a machining fixture and/or an assembly fixture. In this embodiment, the fixture attachment features 32 are holes through the structure of the first frame 8 through which locator pins or other elongate members may be positioned.

In this embodiment, similarly to the first frame 8, the second frame 10 also comprises three longeron landings, each longeron landing being configured to receive a portion of a respective longeron 14, 16, 18. Also, the second frame 10 comprises a plurality of fixture attachment features.

In this embodiment, similarly to the first and second frames 8, 10, the third frame 12 also comprises three longeron landings, each longeron landing being configured to receive a portion of a respective longeron 14, 16, 18. Also, the third frame 12 comprises a plurality of fixture attachment features.

Figure 4:
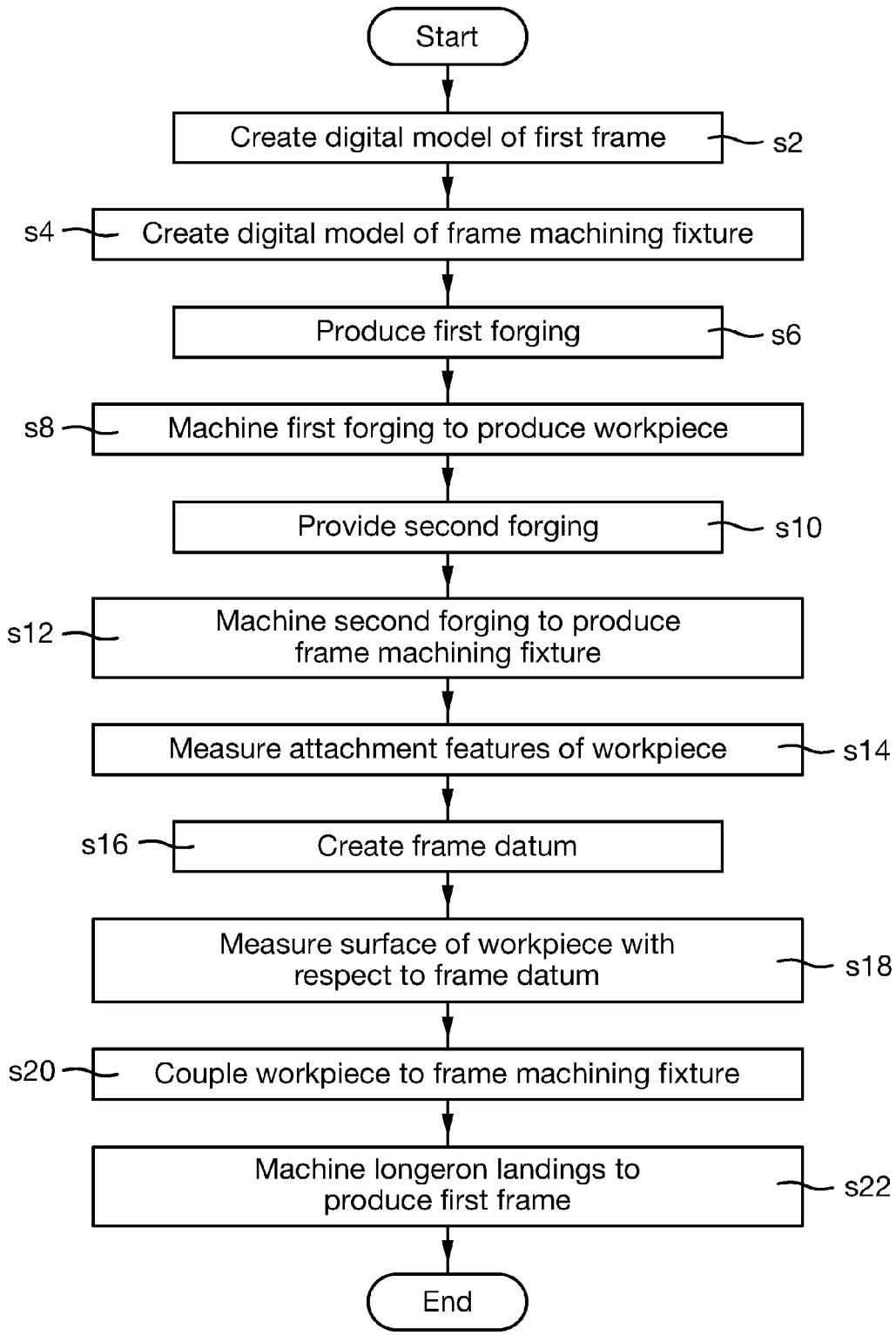
FIG. 4 is a process flow chart showing certain steps of a process of producing the first frame.

FIG. 4 is a process flow chart showing certain steps of a process of producing the first frame 8. A similar process, mutatis mutandis, may be used to produce the second and third frames 10, 12. A similar process, mutatis mutandis, may be used to produce the beam 20. A similar process, mutatis mutandis, may be used to produce the longerons 14, 16, 18.

At step s2, a human designer generates or creates a digital model, hereinafter referred to as the "first digital model". The first digital model is of the first frame 8. This may be performed using a computer and an appropriate software package, for example, the Catia (Trademark) V4 software package. The first digital model may defined using a digital model of the airframe 6 or aft fuselage 4.

At step s4, the human designer generates or creates a further digital model, hereinafter referred to as the "second digital model". The second digital model is of a frame machining fixture. The frame machining fixture is a fixture system that is to be used to secure a workpiece in place whilst that workpiece is machined to form the first frame 8. The frame machining fixture will be described in more detail later below with reference to FIG. 5.

At step s6, a forging system produces a first forging. The first forging is an aluminium blank from which the first frame 8 is to be produced. A digital model of the first forging may be used to produce the first forging. This digital model may be defined using a digital model of the airframe 6 or aft fuselage 4.

At step s8, using the first digital model, a 5-axis computer numerical control (CNC) milling machine machines the first forging to produce a workpiece from which the first frame 8 is to be produced.

In this embodiment, the workpiece is essentially the same shape as the first frame 8 except that the workpiece comprises additional material where the longeron landings 30a-c are to be located. The workpiece comprises the fixture attachment features 32. The workpiece will be described in more detail later below with reference to FIG. 5.

At step s10, the forging system produces a second forging. The second forging is a steel blank from which the frame machining fixture is to be produced. In other embodiments, the blank from which the frame machining fixture is to be produced is a structure created by bolting or welding a plurality of substructures together. A digital model of the second forging may be used to produce the second forging. This digital model may be defined using a digital model of the airframe 6 or aft fuselage 4.

At step s12, using the second digital model, the 5-axis CNC milling machine machines the second forging so as to produce the frame machining fixture. In other embodiments, the frame machining fixture is created by bolting or welding a plurality of substructures together. The first digital model may also be used in the production of the frame machining fixture.

Figure 5:
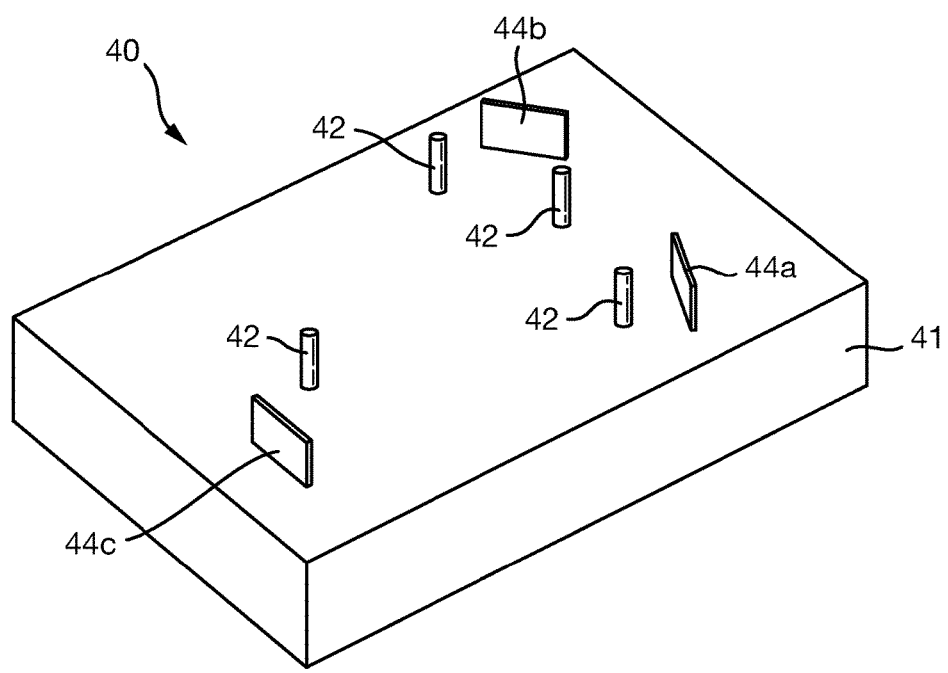
FIG. 5 is a schematic illustration (not to scale) of a perspective view of a frame machining fixture.

FIG. 5 is a schematic illustration (not to scale) of a perspective view of the frame machining fixture 40.

In this embodiment, the frame machining fixture 40 comprises a substantially rigid base portion 41, a plurality of locator pins 42, and a plurality of precision ground blocks 44a-c.

In this embodiment, there are four locator pins 42. The locator pins 42 are located on an upper surface of the base portion 41 and extend away from the upper surface of the base portion 41 in a direction that is substantially perpendicular to that surface. In this embodiment, each of the locator pins 42 is configured to couple to a respective fixture attachment feature 32 of the workpiece. The relative positions of the locator pins 42 correspond to those of the fixture attachment features 32 such that the workpiece may be placed onto the upper surface of the base portion 41 in such a way that each locator pin 42 couples to a respective fixture attachment feature 32, thereby securing the workpiece against the frame machining fixture 40. The workpiece and the frame machining fixture 40 are complementary. The locator pins 42 are configured to securely hold the workpiece to prevent or oppose movement or deflection of the workpiece while the workpiece is being machined.

In this embodiment, the first and second digital models are created concurrently. This tends to facilitate in the production of the complementary workpiece and the frame machining fixture 40.

In this embodiment, there are three blocks 44a-c, namely a first block 44a, a second block 44b, and a third block 44c. The blocks 44a-c are located on an upper surface of the base portion 41 and extend away from the upper surface of the base portion 41 in a direction that is substantially perpendicular to the upper surface of the base portion 41. In this embodiment, the locations of the blocks 44a-c are such that, when the workpiece is coupled to the frame machining fixture 40 by locating the locator pins 42 in the fixture attachment features 32, each block 44a-c is proximate to a respective surface of the workpiece that is to be machined so as to form a longeron landing 30a-c. Furthermore, each block 44a-c includes a surface that is substantially parallel with a respective surface of the workpiece that is to be machined so as to form a longeron landing 30a-c. In particular, the first block 44a is proximate to and substantially parallel with the surface of the workpiece that is to be machined so as to form the first longeron landing 30a. Similarly, the second block 44b is proximate to and substantially parallel with the surface of the workpiece that is to be machined so as to form the second longeron landing 30b. Similarly, the third block 44c is proximate to and substantially parallel with the surface of the workpiece that is to be machined so as to form the third longeron landing 30c.

The positions of the blocks 44a-c in the second digital model may be determined using the positions of the longeron landings 30a-c in the first digital model.

In some embodiments, a coordinate measuring machine (CMM) is used to inspect the locator pins 42 and/or the blocks 44a-c. The frame machining fixture 40 may be further processed, i.e. adjusted, to ensure that the frame machining fixture 40 is as specified by the second digital model, for example, the locator pins 42 and/or the blocks 44a-c may be further machined dependent upon the CMM measurements. This processes of measuring and adjusting the machining fixture may be performed iteratively.

At step s14, a coordinate measuring machine (CMM) measures the relative locations of the fixture attachment features 32 of the workpiece produced at step s8.

At step s16, using the CMM measurements of the fixture attachment features 32 on the workpiece, a computer determines a datum, hereinafter referred to as the "frame datum". The frame datum is a reference system, with respect to the attachment features, from which measurements may be made. The frame datum may be computed using any appropriate software package, for example, the Valisys (Trademark) software package.

At step s18, the CMM measures the surface of the workpiece with respect to the frame datum. Thus, the locations of points on the surface of the workpiece with respect to the fixture attachment features 32 are determined.

At step s20, the workpiece is fixedly secured to the frame machining fixture 40 by placing the workpiece onto the upper surface of the base portion 41 such that each locator pin 42 is coupled to (i.e. positioned through) a respective fixture attachment feature 32. The locator pins 42 may be threaded and the workpiece may be secured to the threaded locator pins 42 by screwing nuts onto the threaded pins.

Figure 6:
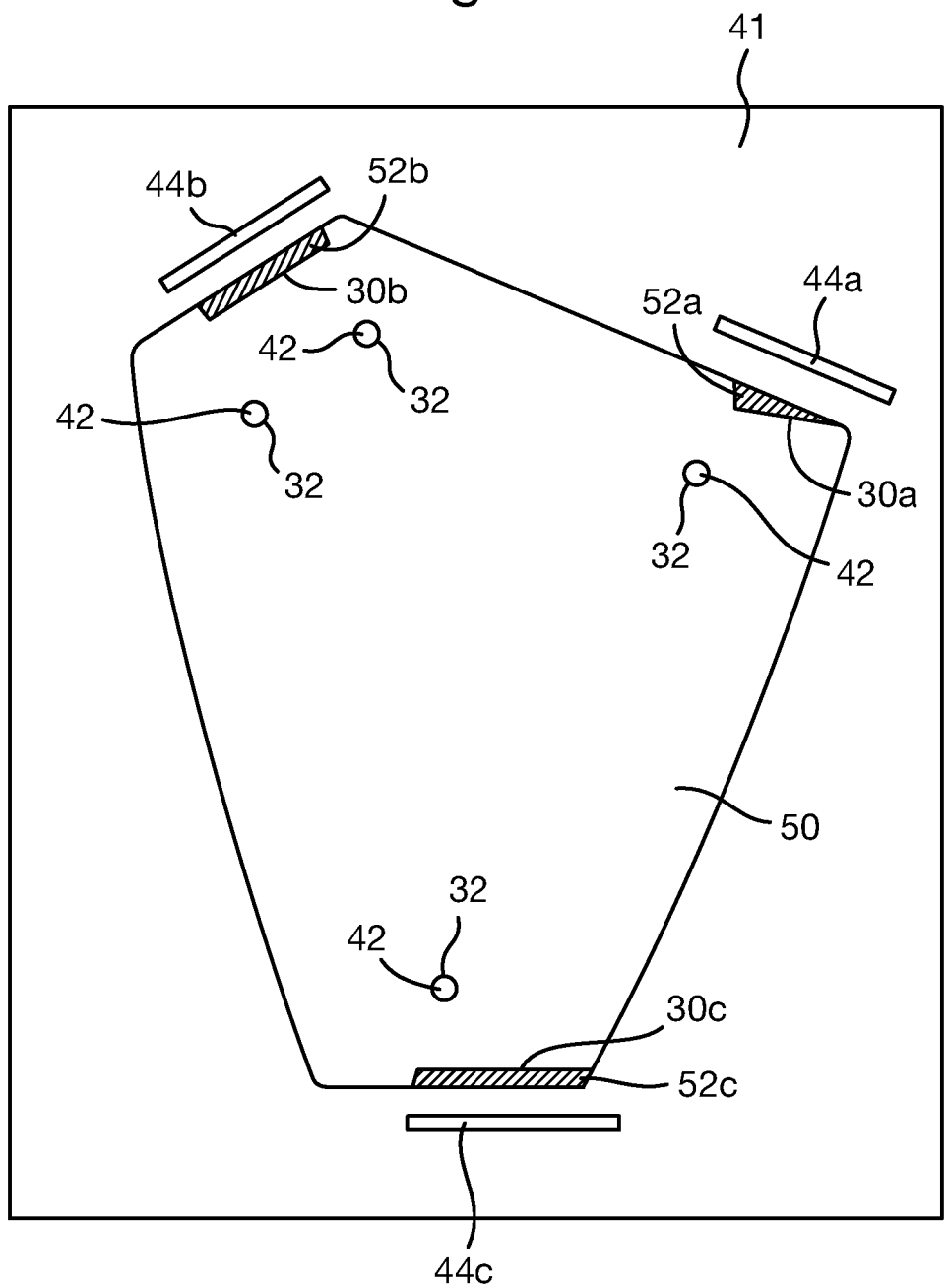
FIG. 6 is a schematic illustration (not to scale) showing a top-down view of a workpiece coupled to the frame machining fixture.

FIG. 6 is a schematic illustration (not to scale) showing a top-down view of the workpiece 50 coupled to the frame machining fixture 40.

The three portions of the workpiece 50 that are to be machined so as to produce the longeron landings 30a-c are hereinafter referred to as the "excess portions" and are indicated in FIG. 6 by hashed regions and the reference numerals 52a-c. As shown in FIG. 6, the blocks 44a-c provide surfaces that are proximate to and substantially parallel with the surfaces of the workpiece 50 that are to be machined to form the longeron landings 30a-c.

At step s22, while the workpiece 50 is attached to the frame machining fixture 40, the 5-axis CNC milling machine machines the workpiece so as to remove the excess portions 52a-c, thereby forming the longeron landings 30a-c and producing the first frame.

In this embodiment, the first excess portion 52a of the workpiece 50 is removed/machined so as to form the first longeron landing 30a. Also, the second excess portion 52b of the workpiece 50 is removed/machined so as to form the second longeron landing 30b. Also, the third excess portion 52c of the workpiece 50 is removed/machined so as to form the third longeron landing 30c.

In this embodiment, the removal of the first excess portion 52a is performed as follows.

Firstly, the 5-axis CNC milling machine probes the surface of the first block 44a, for example, by moving so as to contact with the surface of the first block 44a that is parallel with the surface of the workpiece 50 to be machined. In this way, the CNC milling machine determines the location of its cutting tool in space with respect to the frame datum.

In this embodiment, the positional relationship between the blocks 44a-c and the locator pins 42 is known from the second digital model. Also, when the workpiece 50 is coupled to the frame machining fixture 40, the locator pins 42 are substantially collocated with the fixture attachment features 32 of the workpiece 50. Thus, the positions of the blocks 40a-c with respect to the frame datum are known. Thus, when CNC machine probes (i.e. contacts with) the first block 44a, the position of the cutting tool with respect to the frame datum is known/determined with relatively high accuracy.

Secondly, using the known position of the cutting tool, the measurements of the surface of the workpiece taken at step s18, and the first digital model (which specifies the shape of the first longeron landing 30a), the CNC machine machines away the first excess portion 52a of the workpiece 50 so as to form the first longeron landing 30a. In this embodiment, this machining is performed by moving the cutting tool with respect to the frame datum such that the first longeron landing 30a is formed with a high degree of accuracy relative to the frame datum, i.e. the fixture attachment features 32. Preferably, the cutting tool is moved from the surface of the first block 44a that is parallel with the surface of the workpiece 50 to be machined, in only a single direction, i.e. along only a single axis. This limited movement of the cutting tool from the block advantageously tends to reduce errors.

The removal of the second and third excess portions 52b, 52c to form the second and third longeron landings 30b, 30c respectively is performed using an analogous method to that described above for the forming of the first longeron landing 30a. Thus, in this embodiment, the longeron landings 30a-c are formed with high accuracy with respect to the frame datum (i.e. the fixture attachment features 32).

Thus, a process of producing the first frame 8 is provided.

In some embodiments, measurements of the positions of the blocks 44a-c relative to the locator pins 42 may be used to determine the positions of the blocks 44a-c in the frame datum.

In some embodiments, measurements of the surface of the frame machining fixture 40 (e.g. taken using a CMM) are used to create the "frame datum". For example, the frame datum may be created using measurements of the locator pins 42 on the frame machining fixture 40.

An embodiment of a process of producing the airframe 6 described in more detail above with reference to FIG. 2 will now be described.

Figure 7:
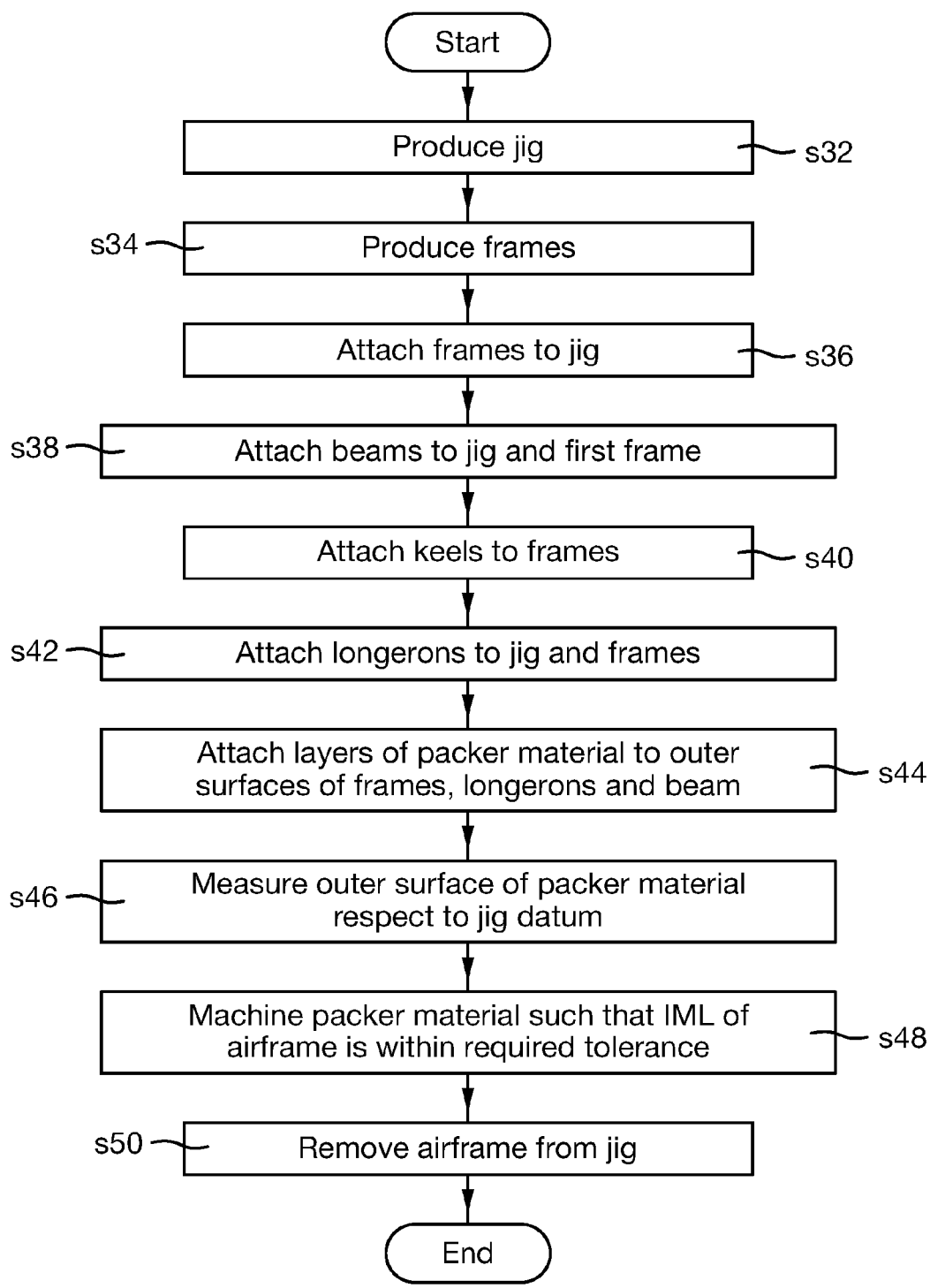
FIG. 7 is a process flow chart showing certain steps of an embodiment of a process of producing the airframe.

FIG. 7 is a process flow chart showing certain steps of an embodiment of a process of producing the airframe 6.

At step s32, an assembly jig is produced. A process of producing the jig is described in more detail later below with reference to FIG. 12.

Figure 8:
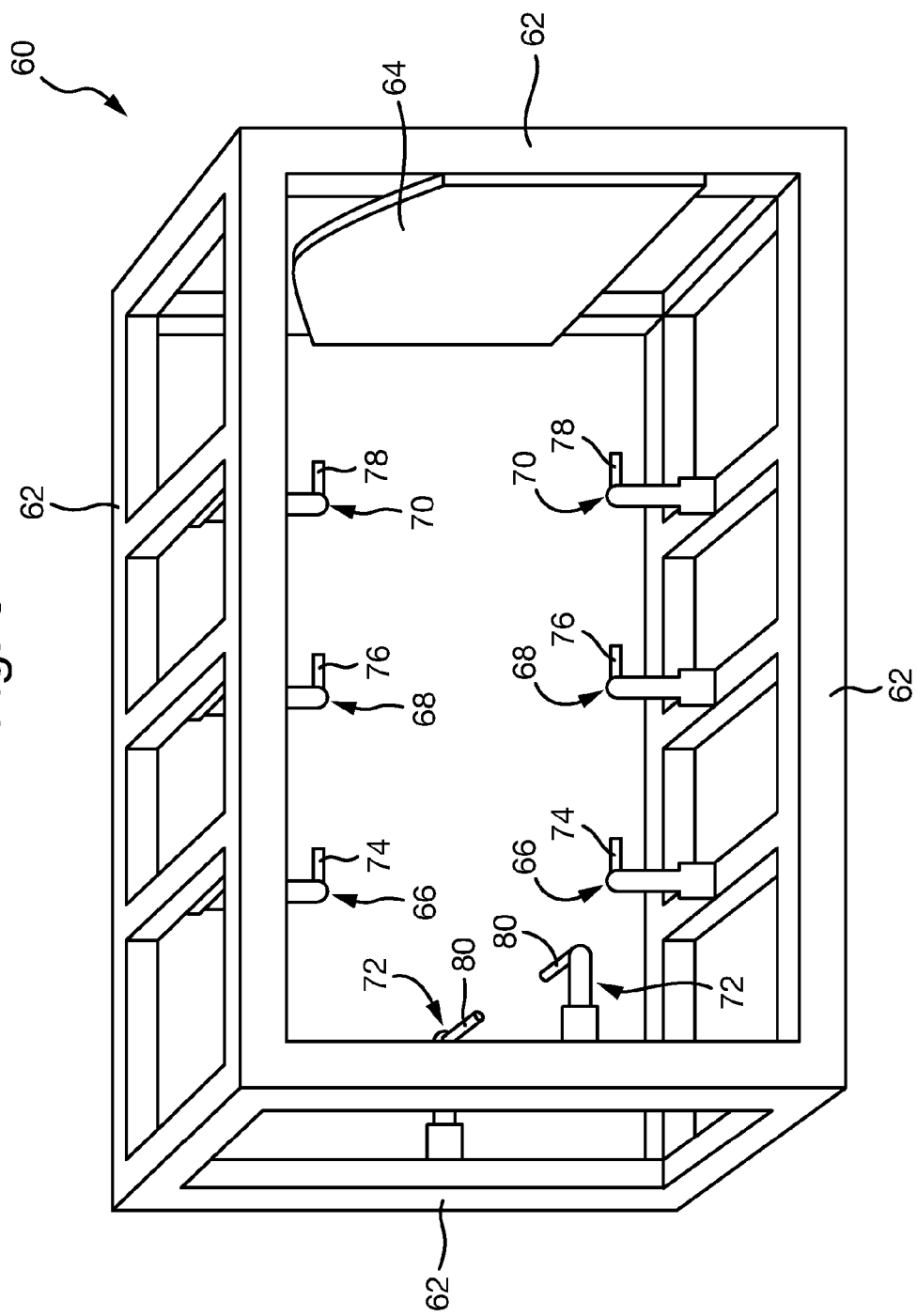
FIG. 8 is a schematic illustration (not to scale) showing a perspective view of an embodiment of an assembly jig.

FIG. 8 is a schematic illustration (not to scale) showing a perspective view of an embodiment of the jig 60 produced at step s32.

In this embodiment, the jig 60 comprises a steel jig frame 62 comprising a plurality of steel beams that are attached together (e.g. by welding) to form a rectangular parallelepiped.

The jig 60 further comprises a steel reference frame 64 attached (e.g. by welding) to one end of the jig frame 62. In this embodiment, the reference frame 64 is, in effect, a copy of the fore fuselage frame to which, during assembly of the aircraft 2, the aft fuselage 4 is to be attached. In other words, the reference frame 64 is substantially the same as the frame of the fore fuselage 5 to which the second free ends 14b, 16b, 18b of the longerons 14, 16, 18 are to be attached.

The jig 60 further comprises four sets of pickup devices, hereinafter referred to as "jig pickups". Preferably, the jig pickups are of universal construction. In this embodiment, each jig pickup comprises a mounting element for mounting the device on the jig frame 62, a receiving element for carrying an airframe component, and a plurality of elongate members having predetermined lengths connected together by means of clamping elements so as to allow six degrees of freedom of movement of the receiving element around three orthogonal axes. Examples of appropriate jig pickups include, but are not limited to, those described in EP1230124 and EP1600379, each of which is incorporated in its entirety herein by reference. The pick-up devices may be formed from aluminium.

Each of the first set of jig pickups is indicated in FIG. 8 by the reference numeral 66. Each of the second set of jig pickups is indicated in FIG. 8 by the reference numeral 68. Each of the third set of jig pickups is indicated in FIG. 8 by the reference numeral 70. Each of the fourth set of jig pickups is indicated in FIG. 8 by the reference numeral 72.

As described in more detail later below with reference to FIG. 12, the first jig pickups 66 are configured to securely hold the first frame 8 in a predetermined position relative to the reference frame 64.

In this embodiment, each of the first jig pickups 66 is attached to the jig frame 62, e.g. by bolts or welding. Attachment using bolts advantageously tends to permit adjustment of the first jig pickups 66 so that their positions on the jig frame 62 are in accordance with a digital model that specifies those positions, and also allows for the removal of the first jig pickups 66 from the jig frame 62.

Each of the first jig pickups 66 comprises an elongate arm to which is attached a receiving element 74, hereinafter referred to as a "first receiving element". Each of the first receiving elements 74 is configured to couple to a respective fixture attachment feature 32 of the first frame 8.

For ease of illustration, only two first jig pickups 66 are shown in FIG. 8. However, in reality, the number of first jig pickups 66 is such that the number of first receiving elements 74 is equal to the number of fixture attachment features 32 of the first frame 8.

As described in more detail later below with reference to FIG. 12, the second jig pickups 68 are configured to securely hold the second frame 10 in a predetermined position relative to the reference frame 64.

In this embodiment, each of the second jig pickups 68 is attached to the jig frame 62, e.g. by bolts or welding. Each of the second jig pickups 68 comprises an elongate arm to which is attached a receiving element 76, hereinafter referred to as a "second receiving element". Each of the second receiving elements 76 is configured to couple to a respective attachment feature of the second frame 10.

For ease of illustration, only two second jig pickups 68 are shown in FIG. 8. However, in reality, the number of second jig pickups 68 is such that the number of second receiving elements 76 is equal to the number of attachment features of the second frame 10.

As described in more detail later below with reference to FIG. 12, the third jig pickups 70 are configured to securely hold the third frame 12 in a predetermined position relative to the reference frame 64.

In this embodiment, each of the third jig pickups 70 is attached to the jig frame 62, e.g. by bolts or welding. Each of the third jig pickups 70 comprises an elongate arm to which is attached a receiving element 78, hereinafter referred to as a "third receiving element". Each of the third receiving elements 78 is configured to couple to a respective attachment feature of the third frame 12.

For ease of illustration, only two third jig pickups 70 are shown in FIG. 8. However, in reality, the number of third jig pickups 70 is such that the number of third receiving elements 78 is equal to the number of attachment features of the third frame 12.

As described in more detail later below with reference to FIG. 12, the fourth jig pickups 72 are configured to securely hold the second ends of the beams 20, 22 in a predetermined position relative to the reference frame 64.

In this embodiment, each of the fourth jig pickups 72 is attached to the jig frame 62, e.g. by bolts or welding. Each of the fourth jig pickups 72 comprises an elongate arm to which is attached a receiving element 80, hereinafter referred to as a "fourth receiving element". Each of the fourth receiving elements 80 is configured to couple to a respective attachment feature of a beam 20, 22.

For ease of illustration, only two fourth jig pickups 72 are shown in FIG. 8. However, in reality, the number of fourth jig pickups 72 is such that the number of fourth receiving elements 80 is equal to the number of attachment features of the beams 20, 22.

At step s34, each of the frames 8, 10, 12 are produced as described in more detail earlier above with reference to FIG. 4.

At step s36, the frames 8, 10, 12 are attached to the jig 60.

In particular, in this embodiment the first frame 8 is attached to the first jig pickups 66 such that each of the first receiving elements 74 is coupled to a respective fixture attachment feature 32 of the first frame 8. Thus, the first frame 8 is fixedly attached to the jig 60 at a predetermined position relative to the reference frame 64. In this embodiment, as described in more detail later below with reference to FIG. 12, the position on the jig 60 of the first frame 8 with respect to the reference frame 64 is the same as the desired position on the assembled aircraft 2 of the first frame 8 with respect to the fore fuselage frame.

Also, in this embodiment the second frame 10 is attached to the second jig pickups 68 such that each of the second receiving elements 76 is coupled to a respective attachment feature of the second frame 10. Thus, the second frame 10 is fixedly attached to the jig 60 at a predetermined position relative to the reference frame 64. In this embodiment, as described in more detail later below with reference to FIG. 12, the position on the jig 60 of the second frame 10 with respect to the reference frame 64 is the same as the desired position on the assembled aircraft 2 of the second frame 10 with respect to the fore fuselage frame.

Also, in this embodiment the third frame 12 is attached to the third jig pickups 70 such that each of the third receiving elements 78 is coupled to a respective attachment feature of the third frame 12. Thus, the third frame 12 is fixedly attached to the jig 60 at a predetermined position relative to the reference frame 64. In this embodiment, as described in more detail later below with reference to FIG. 12, the position on the jig 60 of the third frame 12 with respect to the reference frame 64 is the same as the desired position on the assembled aircraft 2 of the third frame 12 with respect to the fore fuselage frame.

At step s38, the beam 20 is attached to the jig 60 and the first frame 8.

In this embodiment, the beam 20 comprises one or more attachment features, i.e. through holes, proximate to its second end. In this embodiment, the beam 20 is attached to the fourth jig pickups 72 such that each of the fourth receiving elements 80 is coupled to a respective attachment feature of the beam 20. Also, the first end of the beam 20 is attached, e.g. by bolts, to the first frame 8. Thus, the beam 20 is fixedly attached to the jig 60 and the first frame 8. In this embodiment, the beam 20 is attached to the jig 60 such that the second end of the beam 20 is at a predetermined position relative to the reference frame 64. In this embodiment, as described in more detail later below with reference to FIG. 12, the position on the jig 60 of the second end of the beam 20 with respect to the reference frame 64 is the same as the desired position on the assembled aircraft 2 of the second end of the beam 20 with respect to the fore fuselage frame.

At step s40, the keels are attached between adjacent frames 8, 10, 12 e.g. by bolting. In this embodiment, the keels not directly attached to the jig 60 e.g. by pickups, and instead are attached to the frames 8, 10, 12 only.

At step s42, the longerons 14, 16, 18 are attached to the jig 60 and the first frame 8.

In particular, in this embodiment, the first longeron 14 is attached to the first longeron landing 30*a* of the first frame 8, a first longeron landing of the second frame 10, and a first longeron landing of the third frame 12. Also, the second free end 14*b* of the first longeron 14 may be attached to a feature of the reference frame 64 that corresponds to a feature of the fore fuselage frame to which, during assembly of the aircraft 2, the second free end 14*b* of the first longeron 14 is to be attached. In some embodiments, the first free end 14*a* of the first longeron 14 may be attached to the first frame 8 and/or the jig 60 e.g. to a jig pickup.

Also, in this embodiment, the second longeron 16 is attached to the second longeron landing 30*b* of the first frame 8, a second longeron landing of the second frame 10, and a second longeron landing of the third frame 12. Also, the second free end 16*b* of the second longeron 16 may be attached to a feature of the reference frame 64 that corresponds to a feature of the fore fuselage frame to which, during assembly of the aircraft 2, the second free end 16*b* of the second longeron 16 is to be attached. In some embodiments, the first free end 16*a* of the second longeron 16 may be attached to the first frame 8 and/or the jig 60 e.g. to a jig pickup.

Also, in this embodiment, the third longeron 18 is attached to the third longeron landing 30*c* of the first frame 8, a third longeron landing of the second frame 10, and a third longeron landing of the third frame 12. Also, the second free end 18*b* of the third longeron 18 may be attached to a feature of the reference frame 64 that corresponds to a feature of the fore fuselage frame to which, during assembly of the aircraft 2, the second free end 18*b* of the third longeron 18 is to be attached. In some embodiments, the first free end 18*a* of the third longeron 18 may be attached to the first frame 8 and/or the jig 60 e.g. to a jig pickup.

As the longeron landings of the frames 8, 10, 12 have been machined with high accuracy with respect to the fixture attachment features 32 of the frames 8, 10, 12 (i.e. to the frame datums), and the frames 8, 10, 12 have been located on jig 60 at predetermined positions with respect to the reference frame 64 using the fixture attachment features 32 of the frames 8, 10, 12, when the longerons 14, 16, 18 are attached to the longeron landings, the longerons 14, 16, 18 tend to be accurately located at predetermined positions with respect to the reference frame 64. In this embodiment, the positions on the jig 60 of the longerons 14, 16, 18 with respect to the reference frame 64 is the same as the desired position on the assembled aircraft 2 of the third frame 12 with respect to the fore fuselage frame.

A step s44, sacrificial plies or layers of material, which are collectively referred to hereinafter as "packer material" are applied, e.g. using an adhesive, to the surfaces of the airframe components (i.e. the surfaces of the frames 8, 10, 12, the longerons 14, 16, 18, and the beam 20) to which the aircraft skin is to be attached.

In this embodiment, the packer material is applied to the airframe components after the airframe 6 has been assembled in the jig 60. However, in other embodiments, the packer material is applied to the airframe components prior to the airframe 6 being assembled in the jig 60.

Steps s46 to s50 of the process of FIG. 7 will be described in more detail later below after a description of the packer material and its application to the airframe components.

Figure 9:
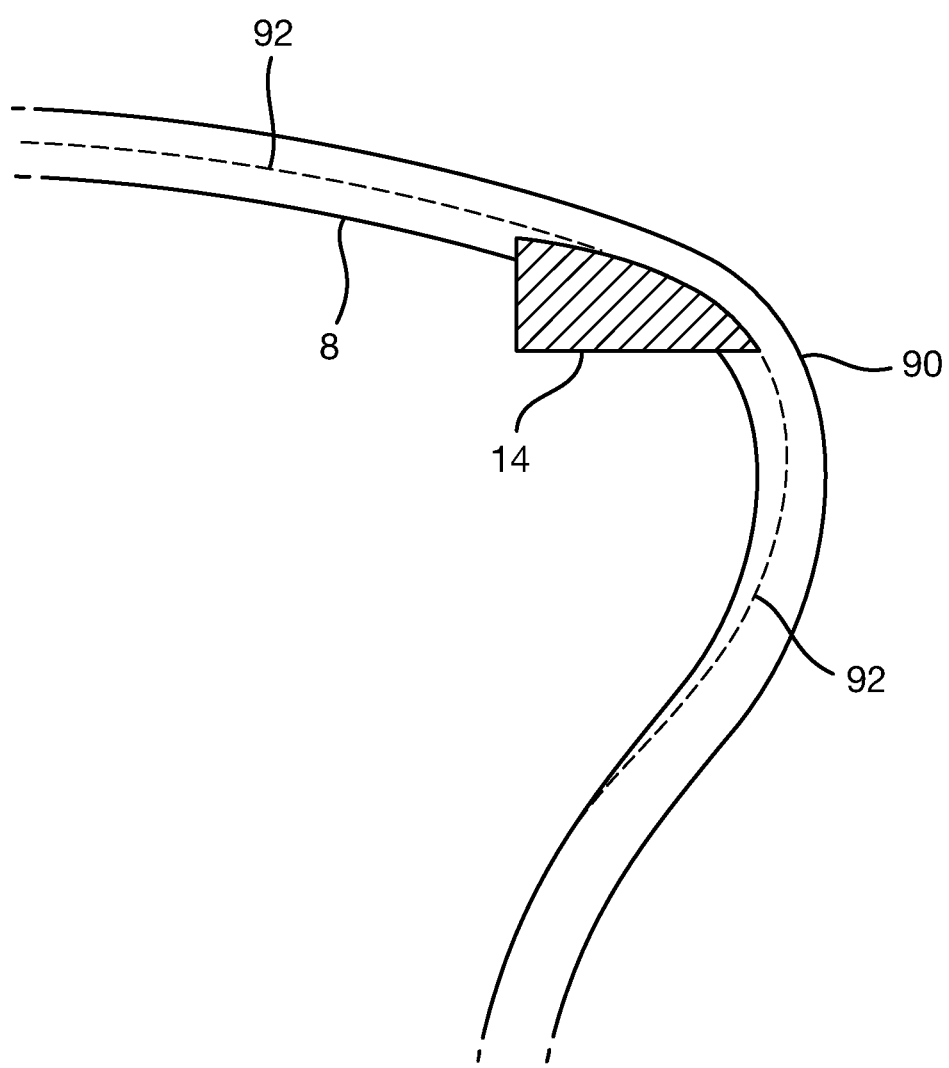
FIG. 9 is a schematic illustration (not to scale) showing packer material applied to an outer surface of the components of the airframe.

FIG. 9 is a schematic illustration showing packer material 90 applied to a surface of the first frame 8 and the first longeron 14.

The desired IML for the airframe 6 is shown in FIG. 9 as a dotted line and is indicated by the reference numeral 92. The IML 92 may be specified in the digital model of the airframe 6 or aft fuselage 4.

In this embodiment, the packer material 90 is made of a composite material such as a fibre-reinforced polymer, i.e. a polymer matrix reinforced with fibres (e.g. carbon or glass fibres). The packer material 90 is a different material to that/those from which the airframe components are made In this embodiment, the packer material 90 is of sufficient thickness to provide that desired IML 92 is at or beneath the outer surface of the packer material 90. The thickness for the packer material may be determined by performing a tolerance analysis using a detail stage inspection of the components and determined assembly tolerances. In some embodiments, the thickness of the packer material is 1.75 mm to 2.29 mm, e.g. 2.03 mm.

In some embodiments, packer material 90 is not added to some or all of the surfaces of the airframe components. For example, in some embodiments, if the outer surface of an airframe component is located at the desired IML 92, packer material 90 is not added to that surface.

The application of the packer material 90 to the components of the airframe 6 may be performed in any appropriate way. In some embodiments, the packer material 90 comprises flat sheets which are pressed against and attached to the components of the airframe 6. Alternatively, the packer material 90 may be shaped to fit against, i.e. be complementary to, the components of the airframe 6. For example, the packer material 90 may be moulded into an appropriate shape by applying the packer material 90 to a mould tool and curing the packer material 90 in an autoclave.

Figure 10:
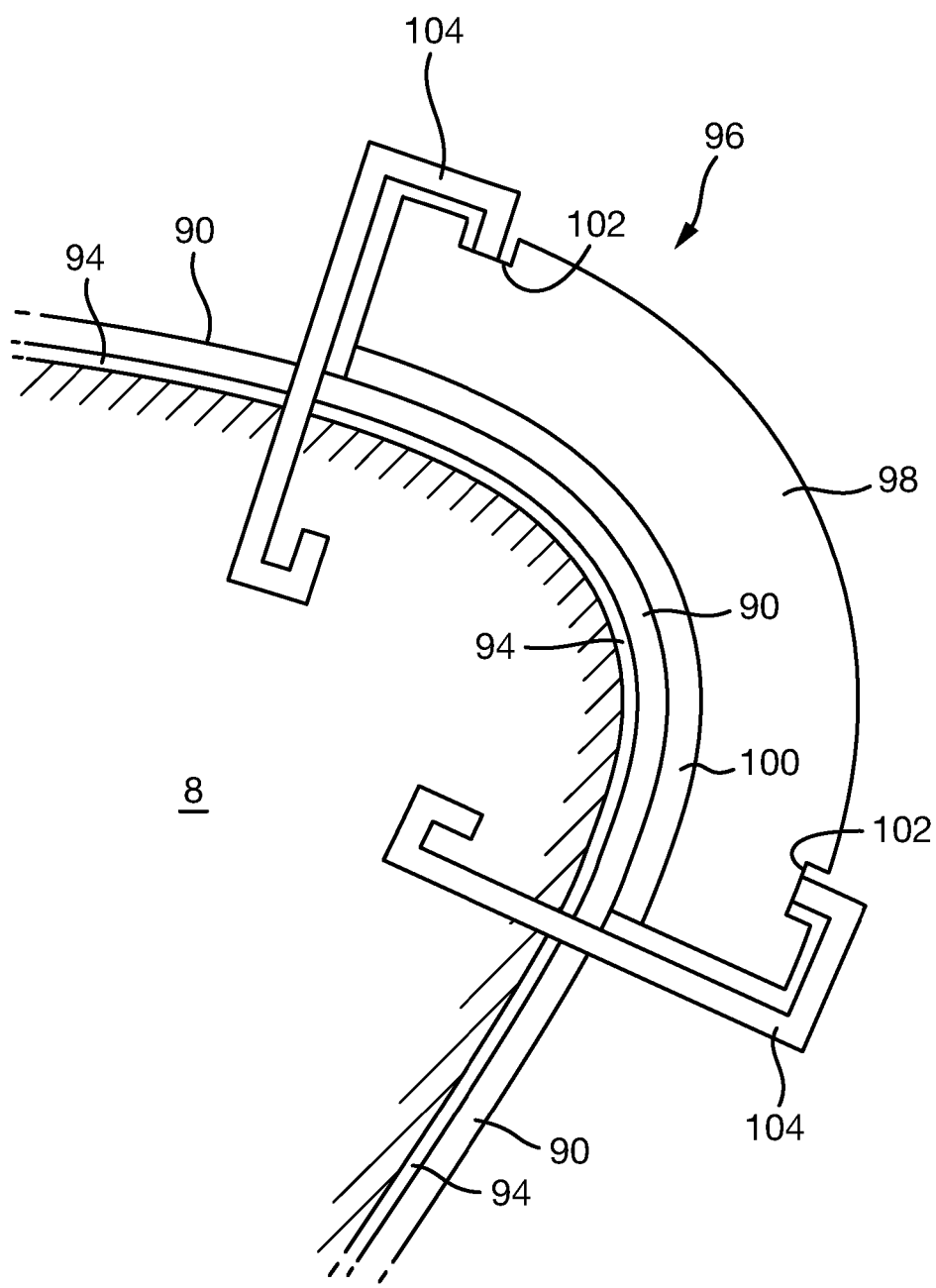
FIG. 10 is a schematic illustration (not to scale) showing an example way in which the packer material may be applied to a surface of an airframe component.

FIG. 10 is a schematic illustration showing an example way in which the packer material 90 may be applied to an outer surface of the first frame 8.

In this embodiment, an adhesive 94 is used to adhere the packer material 90 to the first frame 8. An over press tool 96 is used to hold the packer material 90 in place while the adhesive 94 cures or solidifies.

In this embodiment, the over press tool 96 comprises a rigid body portion 98 (also referred to as a "strong back") and a deformable portion 100. The body portion 98 is substantially non deformable. The body portion 98 comprises a plurality of clamp receiving elements 102 for receiving respective clamp devices 104 such as G-clamps.

In use, the over press tool 96 is positioned onto a portion of the airframe 6 such that packer material 90 is between the over press tool 96 and the first frame 8, and such that the deformable portion 100 of the over press tool 96 is in contact with the packer material 90. The over press tool 96 is then attached to and pressed against the packer material 90 and first frame 8 using a plurality of clamp devices 104 which engage with the clamp receiving elements 102 of the body portion 98 and the first frame 8. The over press tool 96 remains in place until the adhesive 94 has cured and the packer material 90 is securely attached to the first frame 8, at which point the clamp devices 104 and the over press tool 96 are removed.

In this embodiment, the over press tool 96 is shaped to be complementary to a part of the first frame to which the packer material is to be applied. The first digital model (i.e. the digital model of the first frame 8) may be used to specify a shape for the over press tool 96 and/or specify a digital model for producing the over press tool 96. The body portion 98 may then be produced using an appropriate process, such as an Additive Layer Manufacturing (ALM) process, from any appropriate material, such as plastic.

The deformable portion 100 advantageously tends to provide that the force exerted by the over press tool 96 onto the packer material 90 is substantially evenly distributed. Furthermore, the deformable portion 100 tends to facilitate the use of the over press tool 96 in cases where there are assembly positioning errors etc.

In this example, the over press tool 96 is held against the packer material 90 and first frame 8 using a plurality of clamp devices 104. However, in other examples, the over press tool 96 may be held against the packer material 90 and an airframe component in a different way.

Figure 11:
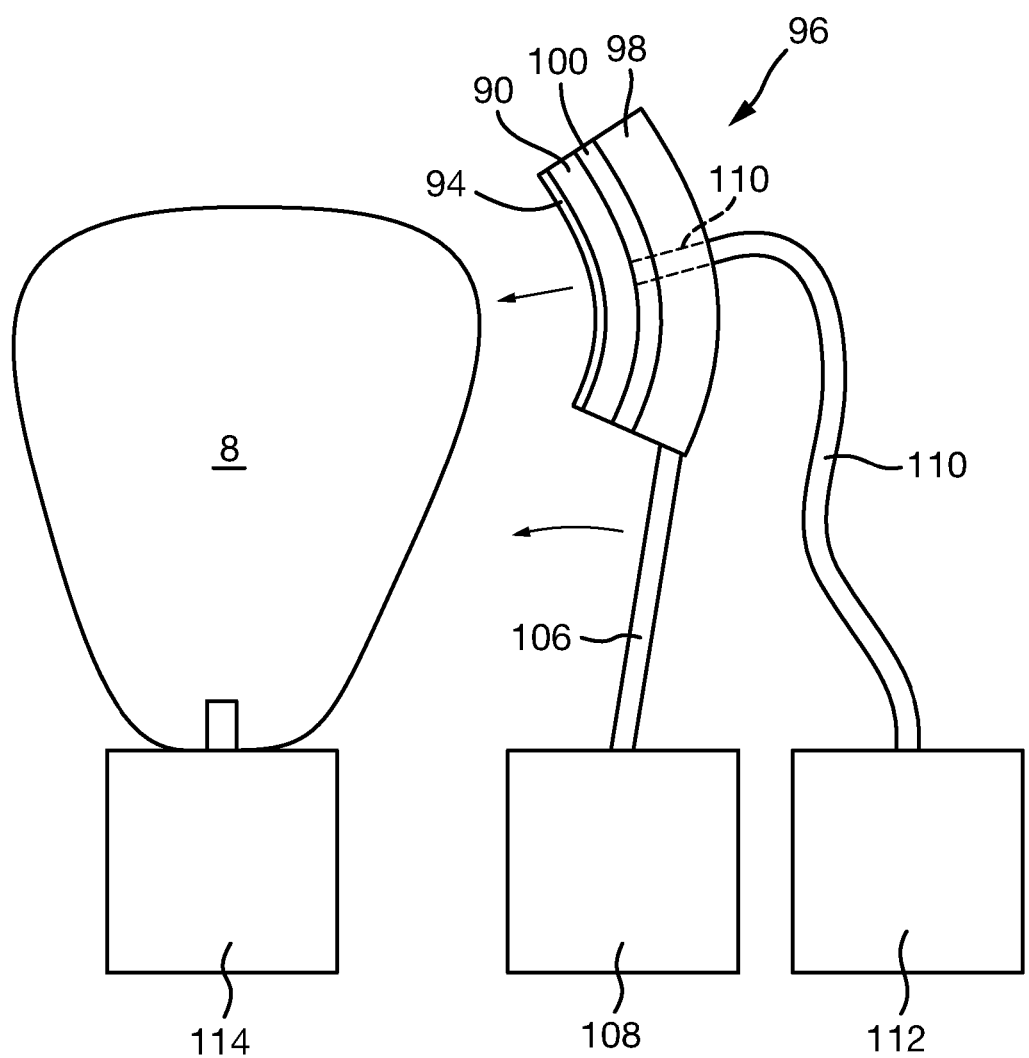
FIG. 11 is a schematic illustration (not to scale) showing a further example way in which the packer material may be applied to a surface of an airframe component.

FIG. 11 is a schematic illustration showing a further example way in which the packer material 90 may be applied to an outer surface of the first frame 8.

In this embodiment, the over press tool 96 further comprises a rigid arm 106 connecting the body portion 98 to an actuation device 108. The actuation device 108 may, for example be a pneumatic or hydraulic actuation device 108 configured to actuate the over press tool 96. The over press tool 96 further comprises a vacuum line 110 connecting the surface of the deformable portion 100 to a vacuum pump 112.

In operation, the first frame 8 is securely held by a support structure 114 (e.g. the jig 60). The packer material 90 is held onto the deformable portion 100 of the over press tool 96 by establishing a vacuum in the vacuum line 110. The over press tool 96 is then actuated by the actuation device 108 in such a way that the packer material 90 coupled to the over press tool 96 is brought into contact with the first frame 8 (i.e. the over press tool 96 is moved in the direction of the arrows in FIG. 11) and firmly pressed against the first frame 8 until the adhesive 94 cures. The vacuum holding the packer material 90 to the over press tool 96 may then be released and the over press tool 96 may be moved away from the first frame 8 leaving the packer material 90 adhered thereto.

Having the packer material 90 be retained against the over press tool 96 and subsequently bringing the packer material 90 coupled to the over press tool 96 into contact with the first frame 8 (as opposed to applying the packer material 90 to the first frame and subsequently bringing the over press tool into contact with the packer material 90 on the first frame 8) advantageously tends to reduce unwanted movement of the packer material 90 with respect to the first frame 8. For example, a likelihood of the packer material 90 that is applied to the first frame 8 moving with respect to the first frame 8 when the over press tool 96 is brought into contact with the packer material 90 on the first frame 8 tends to be reduced or eliminated. Thus, accuracy with which packer material 90 is applied to an object tends to be increased.

Furthermore, having the packer material 90 be retained against the over press tool 96 and subsequently bringing the packer material 90 coupled to the over press tool 96 into contact with the first frame 8 tends to reduce the likelihood of the packer material 90 adhering to the first frame 8 before a pressing force is applied. This tends to improve adherence of the packer material to the object.

Returning now to the process of FIG. 7, at step s46, optionally, a laser tracker or CMM is used to measure the outer surface of the packer material 90 that has been applied to the components of the airframe 6. In this embodiment, the outer surface of the packer material 90 is measured with respect to a so-called "jig datum" which will be described in more detail later below with reference to FIG. 12. In some embodiments, this step may be omitted or may be performed at a later stage.

At step s48, a CNC cutting device is used to machine the packer material 90 such that the outer surface of the packer material 90 is located at the IML 92 specified in the digital model of the airframe 6 or aft fuselage 4 with respect to the fore reference frame 64. Optionally, this may be performed using the laser tracker measurements taken at step s46. In this embodiment, the CNC cutting device is controlled with respect to the "jig datum" *which is described in more detail later below.

Thus, the packer material 90 is machined to allow for variations in component thicknesses and substructure assembly positioning errors. This tends to provide that, when the aircraft skin is attached to the airframe 6, the OML of the aft fuselage 4 is within the pre-specified tolerance with respect to the fore reference frame 4 (i.e. fore fuselage in the assembled aircraft 2). Furthermore, the machined packer material 90 provides a consistent landing surface to which the aircraft skin may be fixed. The landing surface provided by the machined packer material 90 is accurately positioned with respect to the jig datum.

Use of the sacrificial packer material 90 advantageously tends to reduce or eliminate a need to machine the surfaces of the airframe components (i.e. the surfaces of the frames 8, 10, 12, the longerons 14, 16, 18, and the beam 20) to which the aircraft skin is to be attached. Thus, a need for performing post-machining analysis/testing of the airframe components may be avoided or reduced.

Use of the packer material 90 advantageously tends to reduce or eliminate a need for shims to be applied to fill gaps between the airframe 6 and the external aircraft skin when the aircraft skin is attached to the airframe 6.

Steps s46 and s48 may be performed iteratively.

Thus, the airframe 6 is assembled using the jig 60.

At step s50, the assembled airframe 6 may be removed from the jig 60.

Thus, an embodiment of a process of producing the airframe 6 is provided.

Returning now to the process of producing the jig 60 performed at step s32, FIG. 12 is a process flow chart showing certain steps of an embodiment of a process of producing the jig 60.

At step s50, a plurality of steel beams are attached together, e.g. by welding, to form a rectangular parallelepiped, thereby producing the jig frame 62. An example jig frame and method of construction thereof includes, but is not limited to, those described in EP1230124 and EP1600379, each of which is incorporated in its entirety herein by reference. The pick-up devices may be formed from aluminium.

At step s52, the reference frame 64 is attached, e.g. by welding, to one end of the jig frame 62. In this embodiment, the reference frame 64 is a substantially exact replica of at least part of the fore fuselage frame to which the airframe 6 of the aft fuselage 4 is to be attached.

At step s54, a CMM measures a surface of the reference frame 64 on the jig 60. In particular, in this embodiment, the CMM measures features of the reference frame 64 that correspond to those features of the fore fuselage frame to which the airframe 6 is to be attached.

At step s56, using the CMM measurements of the reference frame 64, a computer determines a datum, herein referred to as the "jig datum". The jig datum is a reference system, with respect to the reference frame 64, from which measurements may be made. The jig datum may be computed using any appropriate software package.

At step s58, a human designer generates or creates a further digital model, hereinafter referred to as the "third digital model". The third digital model is of the airframe and the fore fuselage frame. The third digital model specifies the positional relationships between the components of the airframe 6 and the fore fuselage frame, when the airframe 6 is attached to the fore fuselage frame.

The third digital model may be created using a computer and an appropriate software package, for example, the Catia (Trademark) V4 software package.

At step s60, using the third digital model, the human designer or a computer determines positions on the jig frame 60 for each of the jig pickups 66, 68, 70, 72.

In this embodiment, the determined locations on the jig 60 of the first jig pickups 66 are such that, were the first frame 8 to be held by the first jig pickups 66, the position of the first frame 8 relative to the reference frame 64 would be substantially the same as a desired position for the first frame 8 relative to the fore fuselage frame onboard the assembled aircraft 2.

Similarly, the determined locations on the jig 60 of the second jig pickups 68 are such that, were the second frame 10 to be held by the second jig pickups 68, the position of the second frame 10 relative to the reference frame 64 would be substantially the same as a desired position for the second frame 10 relative to the fore fuselage frame onboard the assembled aircraft 2.

Similarly, the determined locations on the jig 60 of the third jig pickups 70 are such that, were the third frame 12 to be held by the third jig pickups 70, the position of the third frame 12 relative to the reference frame 64 would be substantially the same as a desired position for the third frame 12 relative to the fore fuselage frame onboard the assembled aircraft 2.

Similarly, the determined locations on the jig 60 of the fourth jig pickups 72 are such that, were the second ends of the beams 20, 22 held by the fourth jig pickups 72, the positions of the second ends of the beams 20, 22 relative to the reference frame 64 would be substantially the same as a desired position for the second ends of the beams 20, 22 relative to the fore fuselage frame onboard the assembled aircraft 2.

At step s62, each of the jig pickups 66-72 are attached to the jig frame 62, e.g. by bolts or by welding, in the position determined at step s60 for that jig pickup.

Steps s64 and s66 are optional steps for verifying and, if necessary, adjusting the position and/or orientation of the jig pickups on the jig 60. In some embodiments, these steps are omitted or a different verification and/or different adjustment process is performed. Steps s64 and s66 may be performed iteratively.

At step s64, a laser tracker measures the position of each of the jig receiving elements 74-80 with respect to the jig datum, i.e. with respect to the fore reference frame 64.

At step s66, using the laser tracker measurements, the positions of the jig receiving elements 74-80 with respect to the jig datum may be modified to ensure that each of the jig receiving elements 74-80 has the position determined at step s60 for that jig receiving element 74-80. In other words, the positions of the jig receiving elements 74-80 may be modified to ensure that, when the frames 8, 10, 12 are held by the jig receiving elements 74-80, the positions of the frames 8, 10, 12 relative to the reference frame 64 are substantially the same as a desired position for the frames 8, 10, 12 relative to the fore fuselage frame onboard the assembled aircraft 2.

Modifying a position of a jig receiving element 74-80 may be performed by, for example, introducing a shim between a jig pickup and the jig frame 62, or by machining part a jig pickup and/or the jig frame 62.

In some embodiments, the positions of one or more of the jig pickups 66, 68, 70, 72 measured by the laser tracker may be used to update or recalculate the jig datum. For example, in some embodiments, a new jig datum is calculated using measured positions of the reference frame and one or more of the jig receiving elements 74-80. This new jig datum is a reference system, with respect to the reference frame 64 and one or more of the jig receiving elements 74-80, from which measurements may be made.

Thus, an embodiment of a process of producing the jig 60 is provided.

An advantage provided by the above described methods and apparatus is that the airframe advantageously is produced within very tight tolerance bounds that tend not to be possible using conventional production techniques. The airframe is produced with high accuracy relative to the reference frame which is representative of a forebody frame to which the airframe is to be attached. In particular, the airframe is produced such that the IML is within very with tight tolerances with respect to the reference frame. Thus, the assembly of the aircraft, and in particular the attaching together of the aft fuselage and the fore fuselage, tends to be facilitated.

Advantageously, the blocks of the frame machining fixture are precision ground with respect to the locator pins of the frame machining fixture (i.e. the frame datum). During production of the frame, each block is used as a "zero point" from which a cutting tool is moved to machine a respective frame longeron landing close to that block. The proximity of the block to the associated longeron landing advantageously tends means that, in order to form a longeron landing, the cutting tool does not have to be moved large distances from a "zero point". Thus, errors tends to be reduced and the accuracy (with respect to the frame datum) with which the longeron landings are formed tends to be increased.

Advantageously, the above described jig tends to use fewer pickups for holding the airframe components compared to conventional assembly jigs. Thus, the weight and cost of the jig tends to be reduced compared to conventional assembly jigs. Furthermore, as airframe components are held by fewer pickups, damage/stresses resulting from a component being held by pickups tends to be reduced.

Advantageously, the longeron landings of the frames are machined with high accuracy with respect to a local frame datum that is defined by frame features that are used to locate that frame in the assembly jig. Thus, because the jig pickups that couple to the frame attachment features are accurately located on the jig in a desired position with respect to the reference frame, when the frames are attached to the jig, the longeron landings are accurately located on the jig in a desired position with respect to the reference frame. Thus, when the longerons are attached to the longeron landings of the frames, the longerons tend to be are accurately located on the jig in a desired position with respect to the reference frame. Accordingly, gaps or spaces between longerons and frames advantageously tend to be minimised. The use shims to fill such gaps or spaces tends to be reduced or eliminated.

The above described methods and apparatus tends to provide that the frames of the airframe may be produced independently from one another. In other words, there tends to be no requirement to machine or process the frames as a set. This independent production of the frames tends to reduce production time of the airframe compared to conventional processes.

A further advantage provided by the above described methods and apparatus is that non-destructive testing and other processes may be performed on individual airframe components separately. This tends to be difficult if, in contrast to the above described method, multiple airframe components are machined as a set in an assembly jig.

Apparatus, including the any of the abovementioned computers or processes for performing any of the above described data processing method steps may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

It should be noted that certain of the process steps depicted in the flowcharts of FIGS. 4, 7, and 9 and described above may be omitted or such process steps may be performed in differing order to that presented above and shown in FIGS. 4, 7, and 9. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, an airframe of an aircraft aft fuselage is produced. However, in other embodiments, a different type of structure is produced, for example a structure that, in use, is to be attached to a different structure may be produced. For example, an airframe of a different part of the aircraft, e.g. the fore fuselage, may be produced. In such embodiments, the jig may comprise a different type of reference frame representing a different type of entity to which the structure being assembled is to be attached.

In the above embodiments, the aircraft comprises three frames, three longerons, two beams, and a plurality of keels. However, in other embodiments, the airframe comprises a different number of frames, longerons, beams, and/or keels. In some embodiments, one or more of the listed types of airframe components may be omitted. In some embodiments, the airframe comprises a different type of airframe component instead of or in addition to those listed above.

In the above embodiments, a frame comprises four attachment features which are used to determine the frame datum. The frame attachment features are holes through the structure of the frame. Also, the jig comprises jig pickups configured to attach to the frame attachment features. Also, the frame machining fixture comprises locator pins configured to couple to the frame attachment features. However, in other embodiments, one or more of the frames or other airframe components comprises a different number of attachment features. In some embodiments, one or more of the attachment features may be a different type of attachment feature other than a through hole. Also, the jig may comprise a different type of pickup that is configured to attach to the different type of attachment feature. For example, in some embodiments, an attachment feature may be a block-like structure and a jig pickup may comprise a clamp for clamping to the block-like structure. Also, the frame machining fixture may comprise a different type of device that is configured to attach to the different type of attachment feature.

In the above embodiments, longeron landings are machined with respect to a local frame datum. However, in other embodiments one or more different types of frame features are formed with respect to the frame datum instead of or in addition to one or more of the longeron landings.

In the above embodiments, the airframe components are made of aluminium. However, in other embodiments, one or more of the airframe components is made of a different type of material.

In the above embodiments, the jig frame is a steel beam frame in the shape of a rectangular parallelepiped. However, in other embodiments, the jig frame is made of a different material and/or is a different shape.

In the above embodiments, the frame machining fixture comprises three blocks which are used as reference points or surfaces from which a CNC cutting tool is moved. The blocks are located on an upper surface of the frame machining fixture. In other embodiments, the frame machining fixture comprises a different number of blocks or other devices that provide the above described functionality. In some embodiments, one or more of the blocks is located on a different part of the frame machining fixture, e.g. on a side of the base portion.

What is claimed is:

1. A method for producing a system, the method comprising:
   providing a workpiece comprising a plurality of attachment features for attaching the workpiece to a machining fixture, said machining fixture comprising a plurality of fixture receiving elements for receiving the attachment features of the workpiece, the relative positions of the fixture receiving elements being dependent upon the relative positions of the attachment features;
   determining a datum, the datum being dependent upon relative positions of the attachment features, said determining the datum including measuring the relative positions of the fixture receiving elements on the machining fixture and using the measurements of the relative positions of the fixture receiving elements, calculating the datum;
   measuring a surface of the workpiece with respect to the datum;
   providing the machining fixture;
   attaching, using the attachment features, the workpiece to the machining fixture;
   providing a digital model specifying a component of the system, the digital model including the attachment features;
   using the measurements of the workpiece surface and the digital model, controlling the machining apparatus with respect to the datum to machine the workpiece attached to the machining fixture so as to produce the component as specified by the digital model;
   removing the component from the machining fixture;
   providing an assembly tool;
   attaching, using the attachment features, the component to the assembly tool; and
   performing an assembly operation on the component, thereby producing the system.

2. The method according to claim 1, wherein the system is at least part of an airframe of an aircraft.

3. The method according to claim 2, wherein the system is at least part of an airframe aft fuselage.

4. The method according to claim 1, wherein the component is an airframe component selected from the group of airframe components consisting of a frame and a longeron.

5. The method according to claim 1, wherein:
   the system is configured for attachment to a further system; and
   the step of providing the assembly tool comprises:
      determining a position and orientation relative to the further system that the component would have if the system was attached to the further system;
      using the determined position and orientation of the component relative to the further system, determining one or more positions and orientations relative to the further system at which the component is to be supported;
      providing a jig frame;
      attaching, to the jig frame, a reference structure;
      providing a plurality of pickup devices each having a pickup receiving element for receiving a component of the system; and
      securing each pickup device to the jig frame such that each pickup receiving element is at a predetermined position and orientation relative to the reference structure that will position the component at the determined position and orientation relative to the further system at which the component is to be supported.

6. The method according to claim 1, wherein the step of determining the datum comprises:
   measuring the relative positions of the attachment features on the workpiece; and
   using the measurements of the relative positions of the attachment features, calculating the datum.

7. The method according to claim 1, wherein the step of providing the machining fixture comprises:
   providing an initial machining fixture;
   providing a further digital model specifying the machining fixture; and
   using the further digital model and the datum, controlling machining apparatus with respect to the datum to machine the initial machining fixture so as to produce the machining fixture as specified by the further digital model.

8. The method according to claim 1, wherein
   the machining fixture comprises one or more reference surfaces, each reference surface being associated with a component feature; and
   machining the workpiece comprises, for each reference surface:
      locating at least part of the machining apparatus against that reference surface; and
      controlling the machining apparatus to move away from that reference surface with respect to the datum to machine the workpiece so as to form the component feature associated with that reference surface.

9. The method according to claim 8, wherein
   the step of providing the machining fixture comprises:
      providing an initial machining fixture;
      providing a further digital model specifying the machining fixture; and
      using the further digital model and the datum, controlling machining apparatus with respect to the datum to machine the initial machining fixture so as to produce the machining fixture as specified by the further digital model; and
   the step of providing the further digital model comprises:
      using the digital model of the component, identifying one or more component features;
      for each identified component feature, determining a position and orientation of a reference surface thereof relative to the datum; and
      using the determined a positions and orientations of the one or more reference surfaces, determining the further digital model.

10. An apparatus for producing a system that incorporates a component formed from a workpiece comprising a plurality of attachment features, the apparatus comprising:
    a machining fixture configured to receive the workpiece at the attachment features, said machining fixture comprising a plurality of fixture receiving elements for receiving the attachment features of the workpiece, the relative positions of the fixture receiving elements being dependent upon the relative positions of the attachment features;
    one or more processors configured to determine a datum, the datum being dependent upon relative positions of the attachment features, said determining of the datum including measuring the relative positions of the fixture receiving elements on the machining fixture and using the measurements of the relative positions of the fixture receiving elements, calculating the datum;

measurement apparatus suitable for measuring a surface of the workpiece with respect to the datum;

machining apparatus being configured to, using the measurements of the workpiece surface and a digital model specifying the component of the system including the attachment features, be controlled so as to machine the workpiece attached to the machining fixture so as to produce the component as specified by the digital model;

an assembly tool configured to receive the component at the attachment features; and an assembly apparatus suitable for performing an assembly operation on the component on the assembly tool, thereby producing the system.

11. The apparatus according to claim 10, wherein the system is at least part of an airframe of an aircraft.

12. The apparatus according to claim 11, wherein the system is at least part of an airframe aft fuselage.

13. A system produced using the method according to claim 1.

14. The system according to claim 13, wherein the system is at least part of an airframe aft fuselage.

* * * * *